J. Johansen,
Mangle.

Nº 69,813. Patented Oct. 15, 1867.

Witnesses:

Inventor:
Johan Johansen
Per Munn & Co
Attorneys

United States Patent Office.

JOHAN JOHANSEN, OF SPRINGFIELD, ILLINOIS.

Letters Patent No. 69,813, dated October 15, 1867

IMPROVED MANGLE.

*The Schedule referred to in these Letters Patent and making part of the same.*

TO ALL WHOM IT MAY CONCERN:

Be it known that I, JOHAN JOHANSEN, of Springfield, in the county of Sangamon, and State of Illinois, have invented a new and improved Mangling Machine; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved mangle simple in construction, strong, not liable to get out of order, and which will do its work quickly and well without injury to the fabric; and it consists in the construction, combination, and arrangement of the machinery by which the mangle is operated.

Figure 1:
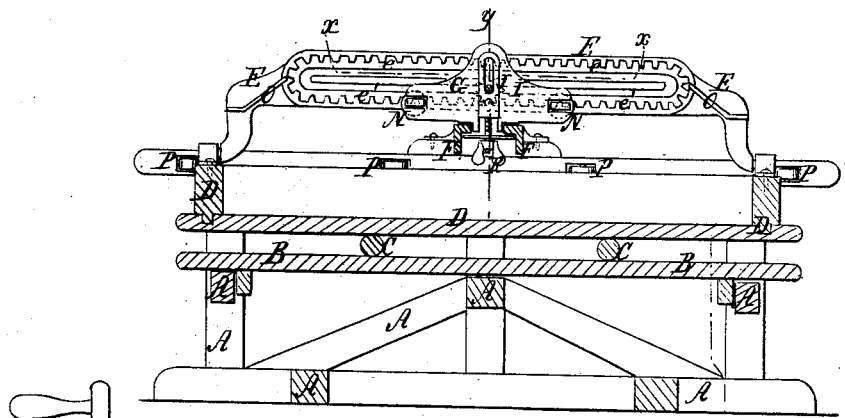
Figure 1 is a vertical longitudinal section of my improved mangle, taken through the line $z\ z$, fig. 2.
Figure 2:
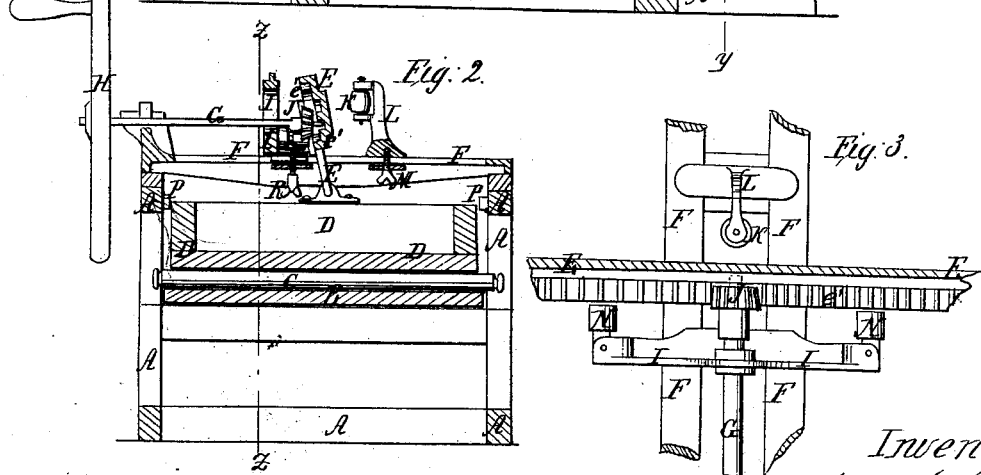
Figure 2 is a vertical cross-section of the same, taken through the line $y\ y$, fig. 1.
Figure 3:
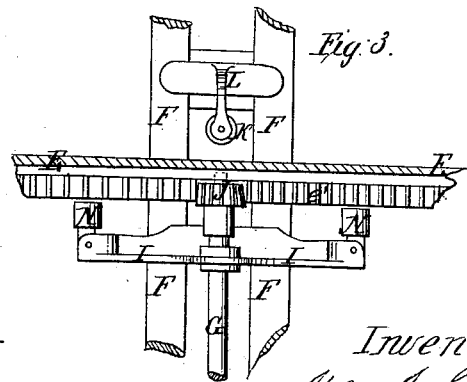
Figure 3 is a detail view of a portion of the top of the same, partly in section, through the line $x\ x$, fig. 1.

A is the frame of the machine, which is put together with screws, so that it may be readily taken apart for storage or transportation, when required. B is the table or platform of the machine, upon which the mangling is done. C are the rollers, around which the cloth to be mangled is wound, and which are rolled back and forth along the table B by the movement of the weight-box D, the bottom of which is made perfectly true and smooth. To the middle part of the upper edges of the ends of the box D are pivoted the ends of the frame or bar E, as shown in figs. 1 and 2. Upon the side of the horizontal part of the bar or frame E is formed an endless rack, $e'$, the teeth being formed in a flange projecting from the side of said frame. Said frame has also a groove formed in it, for the reception of the end of the journal of the pinion-wheel that works in the said rack, to serve as a guide to the movement of said pinion-wheel, and keep it always in gear with the rack. F is a slotted bar, extending from side to side of the box D, and secured at its ends to the middle parts of the edges of its sides. Upon the upper side of one end of the slotted bar F is formed a slotted bearing for the reception of the shaft G, to the outer end of which is attached the crank-wheel H, which should be so heavy as to act at the same time as a balance-wheel. The shaft G passes through and works in a vertical slot formed in the adjustable bearing I for its reception, so as to allow the shaft to move vertically as it passes from one part of the endless rack to the other. The bearing I is secured or clamped to the slotted bar F by a thumb-nut, R, as shown in figs. 1 and 2, so that its position may be changed, as required. To the end of the shaft G is attached a pinion-wheel, J, the teeth of which are slightly bevelled, so that the edges of the working teeth may be horizontal in whatever part of the rack they may be moving, and the ends of the bar or frame E being pivoted enables the said bar or frame to adjust itself to the teeth of the pinion-wheel J. The frame or bar E is kept from moving too far back by coming in contact with the friction-roller K pivoted to the support L, adjustably secured to the slotted bar F by a thumb-screw, M, as shown in fig. 2, and it is kept from moving too far forward by coming in contact with the ends of the friction-rollers N, which revolve upon axles hinged to the projecting ends of the bearing I, as shown in figs. 1 and 3. The rollers N, as the box D is moved back and forth, come in contact with the inclined flanges O, formed upon the side of the bar or frame E, near its ends, as shown in fig. 1, so as to raise the end of said box as the pinion-wheel J passes back and forth between the upper and lower parts of the endless rack. This allows the rollers, upon which the cloth to be mangled is wound, to be readily adjusted, removed, or inserted, as may be required. P are friction-rollers pivoted to the inner sides of the frame A, so that the box D may move back and forth with the least possible friction.

Having thus described my invention, what I claim as new, and desire to secure by Letters Patent, is—

1. The frame or bar E, pivoted at its ends to the ends of the weight-box of the mangle, and having an endless rack and an endless groove formed upon its side, substantially as herein shown and described, and for the purpose set forth.

2. The combination and arrangement of the pinion-wheel J, shaft G, and adjustable slotted support or bearing I, with the pivoted frame or bar E, and with the slotted bar F, substantially as herein shown and described, and for the purpose set forth.

3. The combination of the rollers N with the projecting ends of the bearing I, and with the frame or bar E, substantially as herein shown and described, and for the purpose set forth.

JOHAN JOHANSEN.

Witnesses:
W. D. CROWELL,
A. H. ENICKSON.